United States Patent [19]

Stone et al.

[11] Patent Number: 4,851,655
[45] Date of Patent: Jul. 25, 1989

[54] CHECK POSITIONING SYSTEM FOR USE IN AN AUTOMATIC CHECK PRINTING APPARATUS

[75] Inventors: Christopher A. Stone, Langley; James M. Graverholt, Woodinville; Stuart G. Donaldson, Kirkland; Kevin M. Bagley, Everett, all of Wash.

[73] Assignee: Global Technology, Inc., Everett, Wash.

[21] Appl. No.: 133,542

[22] Filed: Dec. 16, 1987

[51] Int. Cl.⁴ .............................................. B41F 19/00
[52] U.S. Cl. .................................. 235/58 CW; 235/3; 235/58 P; 235/98 C; 364/478; 101/408
[58] Field of Search .................... 235/3, 58 CW, 58 P, 235/60 P, 98 C; 364/405, 408, 478; 101/408

[56] References Cited

U.S. PATENT DOCUMENTS

| | | | |
|---|---|---|---|
| 1,610,640 | 12/1926 | Willis | 235/58 CW |
| 2,804,265 | 8/1957 | Wilson et al. | 235/58 CW |
| 3,381,955 | 5/1968 | Ricciardo et al. | 235/3 X |
| 3,759,177 | 9/1973 | Gazzola et al. | 101/408 X |
| 4,623,965 | 11/1986 | Wing | 364/408 |

*Primary Examiner*—B. R. Fuller
*Attorney, Agent, or Firm*—Graybeal, Jensen & Puntigam

[57] ABSTRACT

The check positioning system includes a guide tray (12) which in turn includes a guiding edge (31). Roller assemblies (18,20,22) in combination with associated lower gripping wheels (40,42,44) and a system (16) for driving the roller assemblies (18,20,22) move the check longitudinally in both directions along the guide tray (12). A clamping apparatus (48) controls the clamping of the check. A deskewing roller (28) on each of the roller assemblies moves the check laterally as well as longitudinally when the check is not clamped. A laterally movable edge detector (14) detects the edges of the check so it can be located relative to the guide tray (12) for accurate printing/encoding of the check.

14 Claims, 4 Drawing Sheets

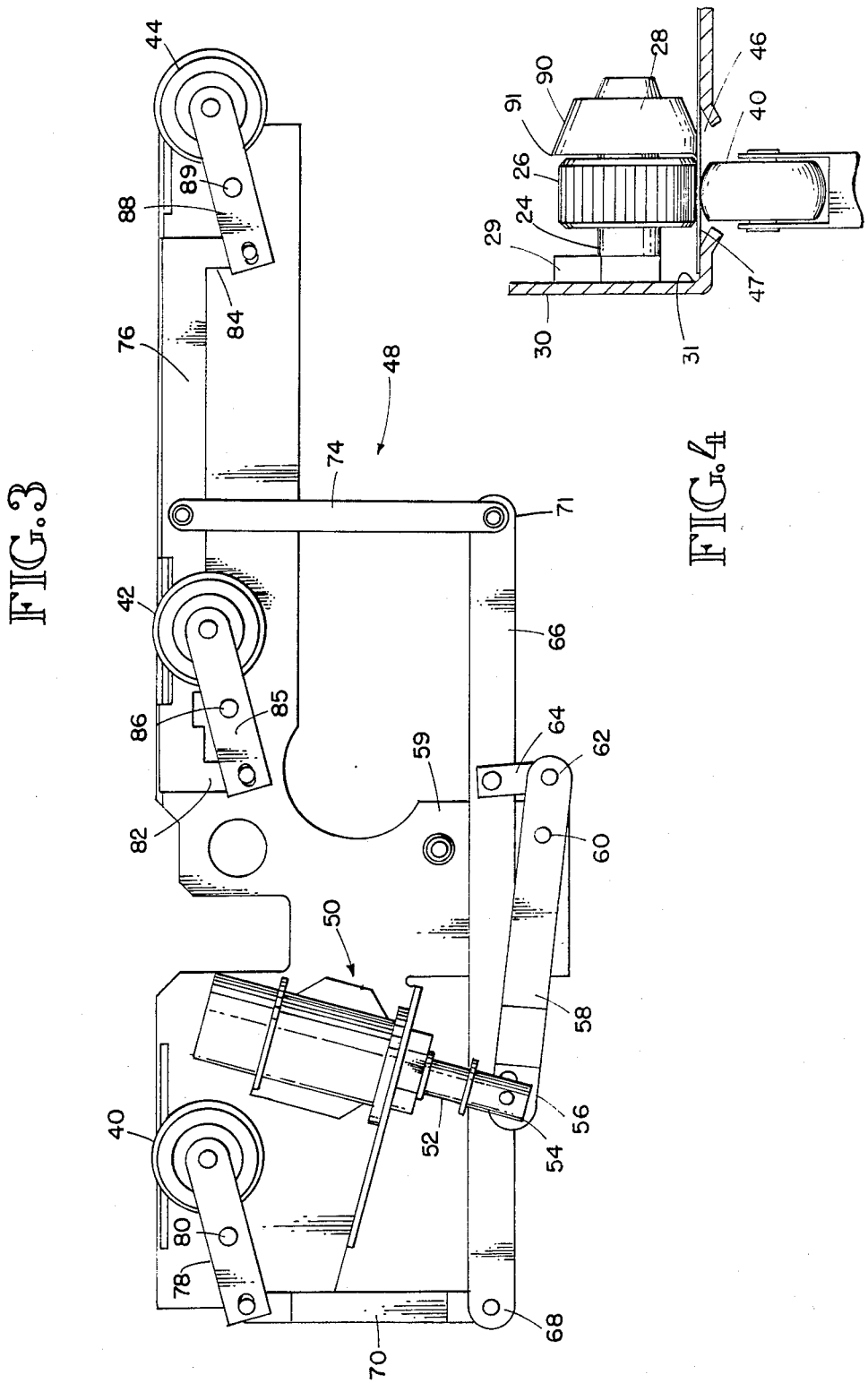

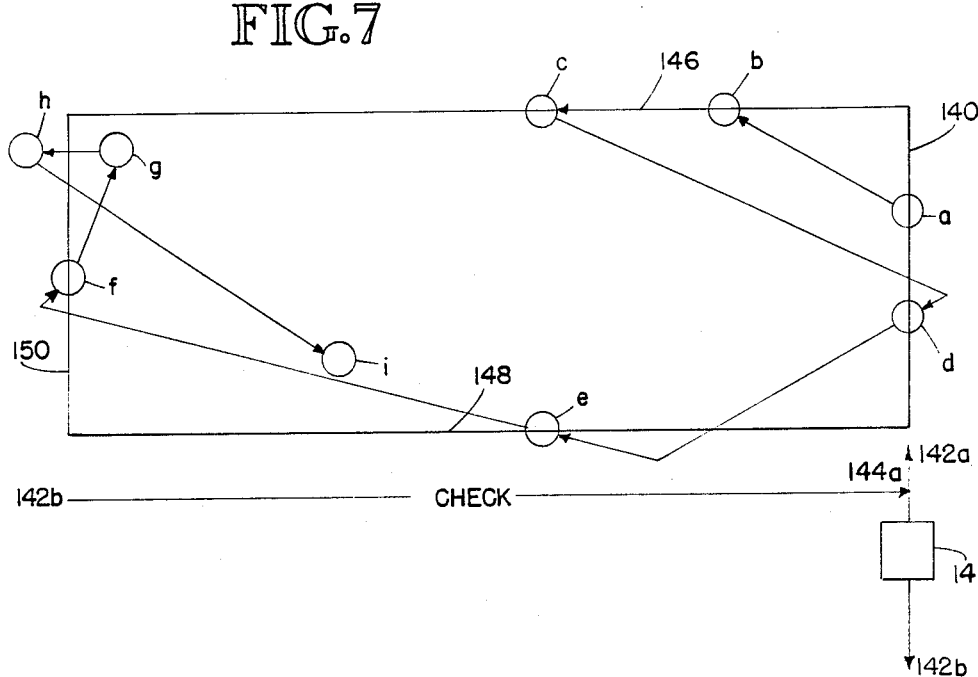
FIG. 7
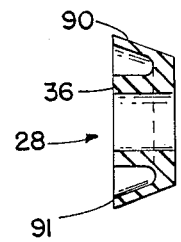
FIG. 9
FIG. 8

CHECK POSITIONING SYSTEM FOR USE IN AN AUTOMATIC CHECK PRINTING APPARATUS

DESCRIPTION

1. Technical Field

The present invention relates generally to the art of check encoding/printing and more specifically concerns a system for automatically positioning the check in a check encoding/printing apparatus following insertion of the check by the user into the apparatus.

2. Background Art

Apparatus for printing MICR (magnetic ink character recognition) characters on a bank check or a similar document is well known. Such apparatus typically includes means for printing information concerning the owner of the check, as well as encoding the required MICR characters along the bottom of the check. Apparatus is also known for automatically printing certain additional information on the check at the point of sale (POS) of goods and services, such as a grocery store. Such additional information may include the date, the payee, the amount of the check and the encoded MICR information concerning the amount, as well as an appropriate endorsement on the rear of the check.

In both of the above applications, as well as for others dealing with the encoding and/or printing of a check, it is important that the check or other document be accurately aligned and positioned relative to the printhead and/or encoder, which print and/or encode the document, as required. The user of such an apparatus will typically insert the check into the apparatus in such a manner that the check is not initially properly aligned. The skewed document thus must be properly aligned as well as accurately sized and positioned, so that the printer/encoder will be able to print/encode the necessary information in the correct location on the checks.

In the past the alignment and positioning of checks has been difficult to achieve entirely automatically; rather, the assistance, at least to some extent, of a trained operator is required.

The present invention, referred to generally as a check positioning system, provides a capability for automatically, and reliably, deskewing, sizing and positioning a check inserted by a user for subsequent printing/encoding. In the embodiment shown, the above described operations are performed on a check which is oriented horizontally. However, it should be understood that such operations are important regardless of the orientation of the check and that the present invention is capable of such operations regardless of the orientation of the system.

DISCLOSURE OF THE INVENTION

Accordingly, the present invention includes a guide tray, or the like, which includes a guiding edge, for receiving a check or similar document and for guiding the movement of the check in the apparatus, a means for recognizing the presence of the check in the apparatus, means for selectively gripping and releasing the check; means associated with the gripping and releasing means for moving the check along the guide tray longitudinally in both directions, means independent of said gripping and releasing means for moving the check laterally toward the guiding edge of the guide tray during both longitudinal directions of movement of the check, sensor means for recognizing when a longitudinal edge of the check abuts the guiding edge of the guide tray and for determining the location of at least one of the end edges of the check.

BRIEF DESCRIPTION OF THE DRAWINGS

FIG. 3 is an elevational view showing the clamping portion of the check positioning system of the present invention.

FIG. 4 is an elevational view of one roller assembly comprising an upper gripping roller and a deskewing roller and an associated lower gripping roller.

FIG. 7 is a top plan view showing the relative relationship between the position of the laterally movable edge detector/sensor and the longitudinal position of the check during successive stages of the alignment and positioning of the check.

FIG. 8 is an elevational view of the light prism portion of the movable edge detector/sensor of FIG. 2.

FIG. 9 is a cross-sectional view of the deskewing roller of FIG. 4.

BEST MODE FOR CARRYING OUT THE INVENTION

Figure 1:
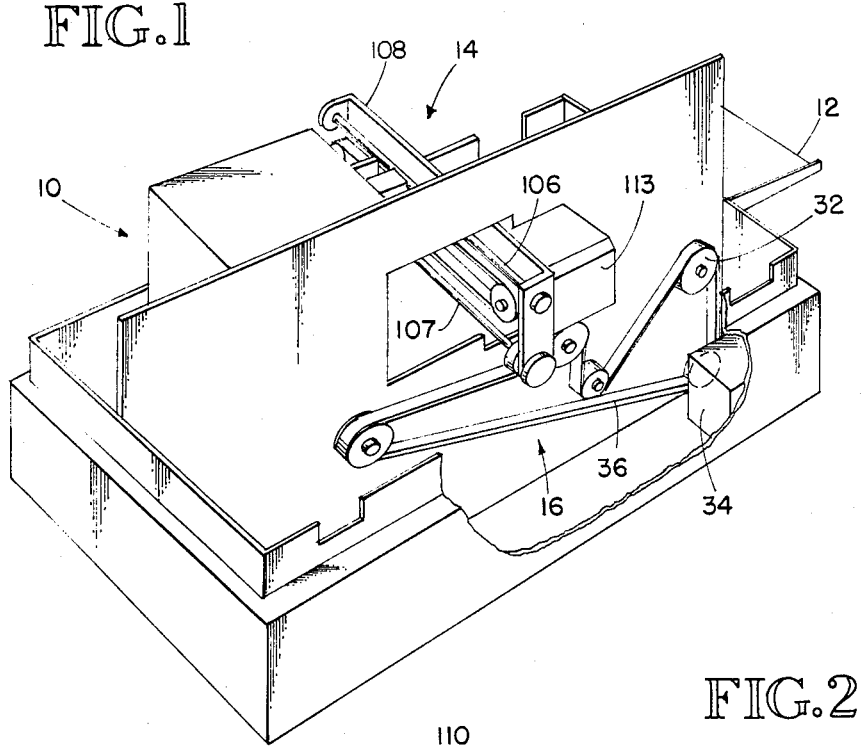
FIG. 1 is an isometric view showing a typical point of sale (POS) check printing/encoding apparatus which incorporates the check positioning system of the present invention.

FIG. 1 shows in general a point of sale (POS) check printing/encoding apparatus for use at the checkout counter of a retail store such as a grocery store. Upon insertion of the check by the customer in the apparatus and subsequent alignment and positioning of the check, the apparatus will print/encode information thereon relevant to the particular transaction being accomplished, i.e. the data, the payee, the amount of the check and the MICR coded amount, as well as an appropriate endorsement on the rear thereof. A POS apparatus is shown generally at 10, with its cover removed so as to expose a portion of the present invention, which is a system for aligning (deskewing), sizing, and positioning the check so that it is ready for printing/encoding. Hereinafter such functions will be collectively referred to generally as "positioning" the check. FIG. 1 includes a horizontal platform or tray 12 upon which the check is laid by the customer for insertion into the apparatus, as well as an infrared movable edge detector/sensor shown generally at 14, which moves laterally across the tray, and an apparatus for driving the check moving system shown generally at 16.

As explained in more detail in the following paragraphs the check positioning system of the present invention includes a fixed sensor for recognizing the presence of a check in the apparatus, a laterally movable edge detector for determining the various edges of the check, a plurality of roller assemblies, driven by stepper motors, and a roller clamping system for moving the check longitudinally and laterally. The entire system is controlled by microprocessor firmware.

Referring now to FIGS. 1, 3, 4 and 6 in more detail, the portion of the present invention for receiving and moving the check, under firmware control, is shown. As mentioned above, the check to be printed and/or encoded by the apparatus shown generally at 10 in FIG. 1 is a placed horizontally on a check platform or tray 12 and then moved slightly thereon into the apparatus by the user. The leading edge of the check is recognized by a fixed LED/infrared sensor combination which results in the apparatus being initialized, including the motors which drive the check moving system.

Figures 5, 6:
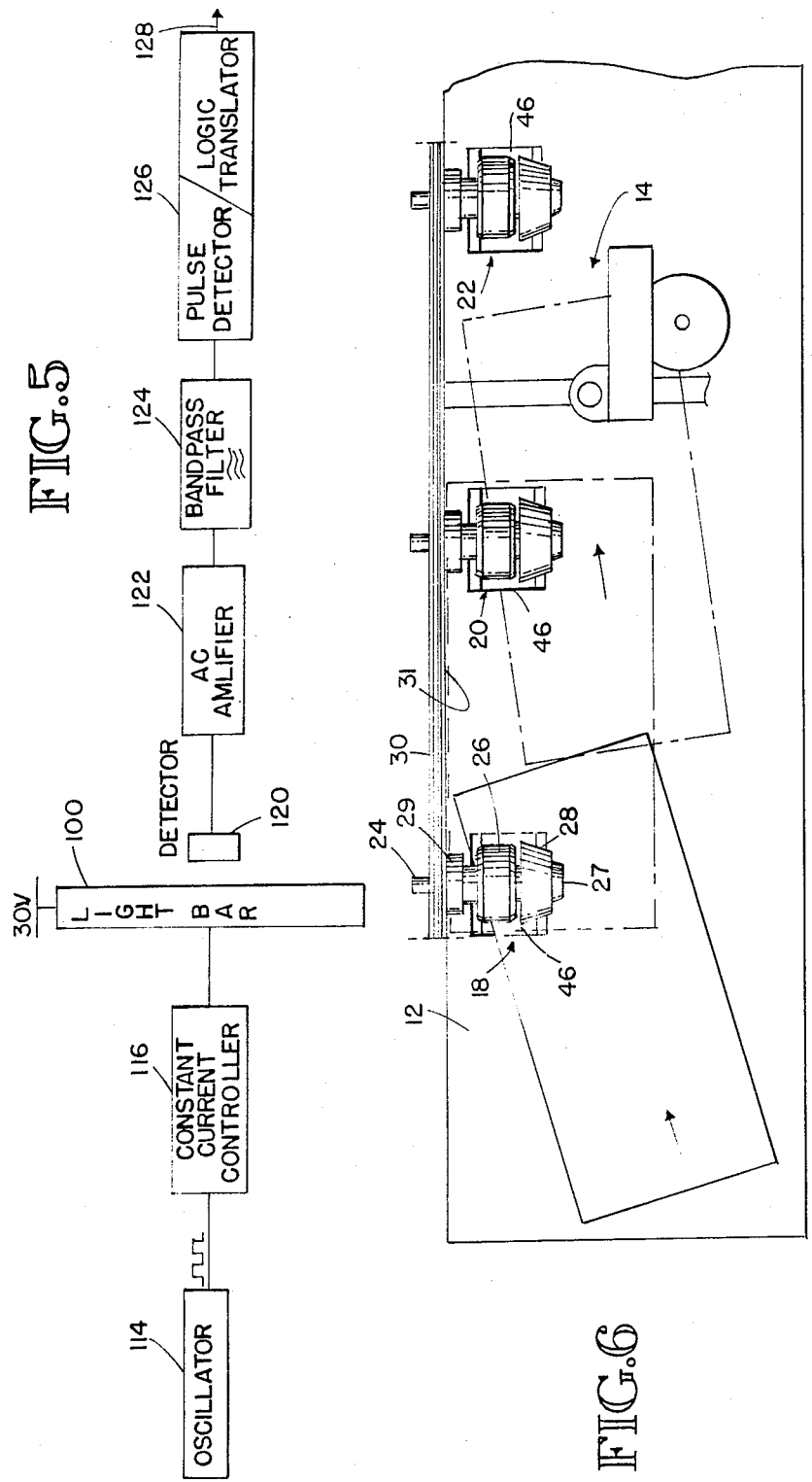
FIG. 5 is a block diagram of the electrical system for the movable edge detector/sensor portion of the present invention.
FIG. 6 is a top plan view showing the relationship of an inserted check to the check positioning system of the present invention.

The check then comes into contact with the first of three successive roller assemblies 18, 20 and 22 (FIG. 6). The roller assemblies are positioned at spaced intervals along the tray 12. Each roller assembly (18 is exemplary) includes a horizontal shaft 24, an upper gripping wheel 26, which is typically of stainless steel, and a deskewing roller 28. The end of the shaft is in the form of a cap 27. The gripping wheel 26 and deskewing roller 28 are mounted on the shaft 24. The shaft 24 is mounted by a mounting nut 29 or the like to a vertical wall 30, the bottom edge of which defines a guiding edge 31 for the check along the tray 12.

The shaft 24 extends through the vertical wall 30 and has mounted thereon at the rear of vertical wall 30 a pulley 32 (FIG. 1). Pulley 32 and other pulleys which are associated with the other roller assemblies 20,22 are driven by a stepper motor 34 and a notched belt 36 in such a fashion that each increment or "step" of motor 34 results in a known rotational displacement of the shaft 24 and hence roller 26, which thereby permits accurate knowledge of the relative movement of the check by the system. The microprocessor controls the operation of the motor in known increments by providing to the motor the correct number of pulses to accomplish the desired rotational movement of the motor shaft. The stepper motor 34 is capable of turning in both directions, i.e. bidirectionally, so that the check may be moved in both longitudinal directions on the tray 12.

FIGS. 3 and 4 show the check clamping system, which is located beneath the tray 12. This system includes three lower gripping wheels 40, 42 and 44. The lower gripping wheels 40, 42 and 44 are typically of plastic, and are positioned so as to mate with the lowermost portion of the upper gripping wheel 26 of each roller assembly 18, 20 and 22. The lower gripping wheels 40, 42 and 44 extend through openings 46—46 (FIGS. 4 and 6) in the tray 12. The openings 46 in the tray have edges which are rounded downwardly as shown in FIG. 4 to prevent any interference with the free movement of the check.

The lower gripping wheels 40, 42 and 44 are moved slightly vertically in both directions under the action of an actuator mechanism shown generally at 48 in FIG. 3 and discussed in more detail below. In the relatively up or raised position of the lower gripping wheels 40, 42 and 44, in which they substantially abut the lowermost portion of the upper gripping wheels 26 of roller assemblies 18, 20 and 22, the check 47 is held firmly between the pairs of upper/lower gripping wheels and may be reliably moved known distances by action of the stepper motor 34. In the relatively down or lowered position of lower gripping wheels 40, 42 and 44, they are slightly away from their associated upper gripping wheels 26—26, and the check is relatively free to move therebetween.

Referring to FIG. 3 in detail, a solenoid 50, which is under the control of an electrical signal from the microprocessor, has an extending actuator arm 52 which moves in and out relative to the body of the solenoid 50. The free end 54 of the actuator arm 52 is attached to one end 56 of a drive arm 58, which is typically oriented horizontally and is pivotally attached to a frame member 59 about a pivot pin 60. The other end 62 of drive arm 58 is connected to a short vertical link 64, the top of which is connected to a cross link 66. One end 68 of cross link 66 is connected to a first intermediate arm 70 which is oriented vertically while the other end 71 of cross link 66 is connected to a second vertical intermediate arm 74.

The upper end of second intermediate arm 74 is connected approximately to the center of a horizontal connecting arm 76. The upper end of the first intermediate arm 70 is connected to a first actuating arm 78 which in turn is pivoted about pivot pin 80 and then is connected to lower gripping wheel 40. Horizontal connecting arm 76 has two depending ears 82 and 84 from the opposite ends thereof. A second actuating arm 85 extends from the lower end of ear 82 and is pivoted about pivot pin 86 and then is connected to second gripping wheel 42. The third actuating arm 88 extends from the lower end of ear 84 and is pivoted about pivot pin 89 and then is connected to lower gripping wheel 44.

In operation, actuation of the solenoid 50 results in the arm 52 pulling inwardly, thereby pulling upwardly end 56 of arm 58, which in turn pivots about pivot pin 60, moving cross link 66 downwardly as well as and first and second intermediate arms 70 and 74. This action results in lower gripping wheels 40, 42 and 44 moving upwardly against the upper grip wheels 26—26.

The advantage of the particular clamping structure shown, with its linkage arrangement, is that substantially exactly the same pressure, within normal mechanical tolerances, is achieved for each pair of upper and lower gripping wheels. This equalization of pressure occurs regardless of the precise adjustment of the gripping wheels and regardless of whether the check is between 1 or 2 or all of the pairs of gripping wheels. The system is thus mechanically self-adjusting, i.e. mechanically equalized. This feature is important for reliable operation of the present invention.

The roller assemblies 18, 20, 22 each include a deskewing roller 28, positioned at the respective ends thereof, as shown in FIGS. 4 and 6. FIG. 9 also shows the deskewing roller in more detail. Rollers 28 are responsible for deskewing, i.e. aligning, the check against the guiding edge 31 established by the vertical wall 30. Deskewing of the check or other document is accomplished when the lower gripping wheels 40, 42 and 44 are in their lowered position, so that the check is not being gripped between the upper and lower gripping wheels and is thus free to move laterally as well as longitudinally. The specific steps in the deskewing of a check will be explained in more detail in the following paragraphs.

The deskewing roller 28 comprises a thermoplastic rubber having a high coefficient of friction. Roller 28 comprises a central portion 36 having an axial opening therethrough for placement of the roller on shaft 24 of each roller assembly, as shown in FIGS. 4 and 6. This portion is approximately 0.375 inches high. At the peripheral edge of the central portion is an angular wall portion 90 which tapers outwardly away from the longitudinal centerline of the roller, at an angle of approximately 20 degrees. The thickness of the wall portion 90 is approximately 0.062 inches, while its height is also approximately 0.375 inches. The diameter of the wall portion 90 at its free edge 91 is approximately 1.125 inches. The wall portion 90 is flexible and can be readily deformed, particularly inwardly.

The roller 28 has an uncompressed diameter slightly larger than the diameter of upper gripping wheel 26 and is otherwise of such a size and configuration and is positioned relative to the tray 12 such that the lowermost portion of roller 28 contacts the check, with the wall portion 90 of roller 28 being slightly deformed or compressed against it by pressure, as shown most clearly in FIG. 4. When compressed, the diameter of roller 28 is approximately equal to that of wheel 26. The advantage of such a roller structure, as explained in more detail below, is that rotation of rollers 28—28, in either rotational direction, results in lateral movement of the check only in the direction of the guiding edge 31, without the need for additional moving parts, as is common with conventional bidirectional deskewing devices and without a lag or delay in the deskewing actin when direction reversal occurs. Deskewing action in the embodiment shown is thus substantially continuous.

Figure 2:
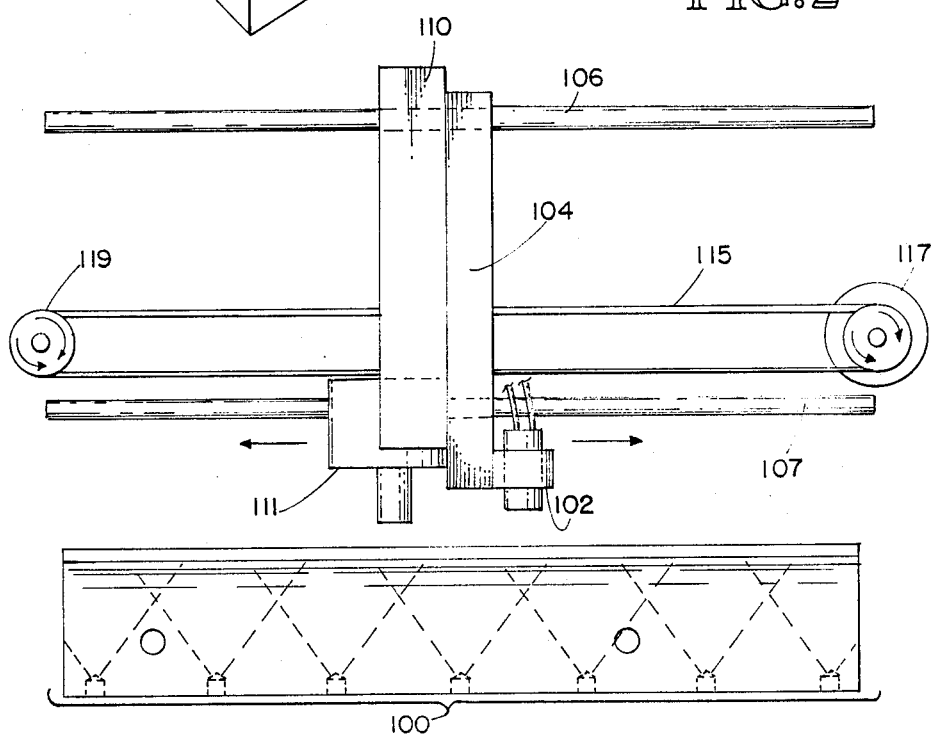
FIG. 2 is an elevational view showing the laterally movable edge detector or sensor portion of the present invention.

FIGS. 2, 5 and 6 show the laterally movable edge detector system 14 of the present invention. As indicated above, the present invention also includes an initial check sensor which is positioned somewhat downstream of the leading edge of the tray 12. This initial check sensor detects the presence of a check in the apparatus and comprises the combination of a light emitting diode and an infrared sensor, both located below the tray 12.

The remaining check detection functions are accomplished by the laterally movable edge detector 14, which is positioned between the second and third roller assemblies 20 and 22, as shown most clearly in FIG. 6. The detector 14 includes a light emitter section which comprises a plurality of fixed LEDs 100 located in a line underneath the tray 12. In the embodiment shown, there are seven LEDs having an emission angle of approximately 60°. They are mounted in a plexiglass L shaped light bar 101 (FIG. 8) which results in the light being evenly distributed across the tray. The shape of the light bar gives the proper length within the space available. The light from the diodes is diffused by the plastic light bar and reflected by a 45° diffusing prism 103 which is roughened at the top surface 105 thereof. The light exits through a lateral slot in the tray. In the embodiment shown, this slot is covered by a transparent strip of plastic.

Positioned above the line of LEDs is an infrared sensor 102 which is mounted on a vertical mounting plate 104 (FIG. 2). The mounting plate 104 in turn is supported by, and moves along, upper and lower lateral rods 106, 107 which are mounted in a frame 108 (FIG. 1) which is fixed in position and extends laterally across the tray 12 above the surface thereof. The mounting plate 104 with sensor 102 mounted thereon moves laterally across the check tray 12 over the slot in the tray through which the LEDs shine, guided by upper and lower mounting rods 106 and 107.

Secured to the mounting plate 104 is a print ribbon/ribbon motor assembly 110 and a dot matrix print motor and font assembly 111, which prints selected information on the check after the check has been positioned and deskewed. Control information is provided to print assemblies 110 and 111 by the microprocessor. The combination of elements 102, 104, 110 and 111 is moved laterally across tray 12 by a stepper motor 113, a toothed pulley 117 which is secured to the shaft of motor 113, pulley 119, and notched belt 115 which connects pulleys 117 and 119.

The electrical circuitry for the detector 14 is shown in FIG. 5. An oscillator 114 in the embodiment shown generates a one kilohertz pulse train which is used to drive a constant current generator of conventional design 116. Generator 116 provides a constant level of power to the set of infrared light emitting diodes shown as bar 100. As indicated above, the diodes 100 are mounted such that light is evenly distributed across the check tray 12. The light is detected by an infrared phototransistor 120 which moves as described above laterally across the check tray under the control of stepper motor 113. The output from the photo transistor 120 is applied to a conventional AC amplifier 122. The amplifier 122, besides amplifying the signal from the detector, protects the system from ambient light and from DC drift. The amplifier 122 amplifies the alternating AC signal from the LEDs, including the pulse train signal from oscillator 114. The output from the amplifier 122 is in turn applied to a band pass filter 124 which has a one kilohertz center freqency with a bandwidth of approximately 200 Hertz. This insures that there will be no 60 Hertz signal applied to the pulse detector 126.

The output from filter 124 is applied to a pulse detector circuit 126 which is arranged so as to detect the absence of a pulse. As is discussed in more detail below, the absence of a pulse is a significant event in the detection process of the presnt invention, as it indicates the detection of the check, typically the edge thereof. As soon as a pulse is not detected when it otherwise should be, the pulse detector 126 changes state, with the logic output on line 128 changing from high to low.

The output from the pulse detector 126 is applied to a system microprocessor, which controls the operation of the system. The microprocessor receives information from the sensors, including the fixed leading edge detector, and laterally movable edge detector 14 and controls the operation of the entire apparatus, including specifically the elements described above with respect to the positioning of the check in the apparatus for printing thereof.

The microprocessor includes a resident firmware multitasking operating system. The tasks performed by the microprocessor include direct communication with and control of the system hardware, such as for example, motor control and actuation of print hammers and solenoids for check clamping, which tasks or functions are executed as particular variable-delay interrupt processers as described more fully below.

The firmware is divided into four sections or modules, as follows:
1. NIEM—Noninterrupt executive manager
2. EIMO—Executive interrupt manager
3. DIMO—Driver interrupt routines
4. COMM—Communications interrupt routines Th alignment/deskewing of the check or other document, following insertion thereof by the user into the apparatus, is accomplished completely by the EIMO module, in communication with the NIEM and DIMO modules.

Several hardware functions must be executed asynchronously by the firmware. These functions include actuation and control of motors, the printing of conventional characters, clamping of the check or other document and the encoding of MICR characters.

The list of active interrupt processes (IRQ list) is in the form of a linked list of data structures which actually define the active interrupt processes, as described below.

The executive interrupt manager (EIMO) module noted above includes the following module data structures (MDS) which define the processes for managing the multiple operations of the present invention.

MDS_EIMOD—Executive interrupt module process

MDS_SWITCH—Switch monitor process for external input

The driver interrupt routines module (DIMO) includes the following module data structures which define the processes which control the interfacing with the various stepper motors.

MDS_VER—Transverse motor process
MDS_TPT—Transport motor process
MDS_FNT—Font motor process
MDS_FRB—Font ribbon motor process
MDS_VRB—Printer ribbon motors process As can be seen, most but not all, of the data structures listed above are directly related to the alignment and deskewing process of the document after it has been received in the apparatus.

Each of data structures contains the following significant variables:

1. MNext—The address of the next module in the linked list. This is a null if the last module in the list.
2. MTLPntr—The task list pointer (TLP) which points to a list of tasks to be performed in a particular process.
3. MDelVal—The time delay between successive executions of a particular process.
4. NTime—The time after the previous active process has executed before a particular process begins execution. The sum of the time values of the processes in the IRQ list prior to a particular process is the time before that process will next execute.

The data structures for VER, TPT, FNT, FRB and VRB processes contain the following data relative to control of the various stepper motors.

1. MTable—The address of a motor step table
2. MPulse—Index into MTable for the current state of the motor windings.
3. MDirect—Direction to advance through the motor step table
4. MDestStep—The number of steps necessary to advance to desired destination.
5. MPort—The address of the port to access the motor windings.
6. MCurStep—The current step number for the motor.

When an interrupt occurs, the first process in the active interrupt list is removed from the list. Control is then dispatched to the first task in the task list pointed to by the MTLPntr. Upon exit, the task may re-queue the current process, thus keeping it active, or it may return, in which case the process is no longer active.

When the MDS_EIMOD process results in detection of the presence of a document, the MDS_VER and MDS_TPT processes are activated, which include task lists for the deskewing and alignment of the document.

The following are module management and process control routines and a brief explanation of their functions.

QueModule—Enters the specified module in the linked list of active processes pointed to by the IRQ LIST. The process is queued to execute after a delay which is specified structure MDelVal.

Before QueModule is called, IRQ_LIST points to MDS_A, MDS_A.MNext points to MDS_B, and MDS_B, MNext is NULL, indicating that this is the end of the list. Therefore, the active processes are MDS_A and MDS_B.

| IRQ LIST = MDS_A | MDS_A | MDS_B |
|---|---|---|
| | MNext = MDS_B | MNext = NULL |
| | MDelVal = 2000 | MDelVal = 2000 |
| | Time = 1000 | Time = 1000 |

MDS_A and MDS_B both execute every 2000 clock cycles (referred to as ticks). MDS_A will begin execution 1000 ticks after the start of the current interrupt, and MDS_B will begin execution 1000 ticks after the beginning of the MDS_A interrupt.

If QueModule is called with $MDS\_C.MDelVal = 500$, meaning that MDS_C should execute 500 ticks after the current interrupt started, MDS_C will be inserted into the IRQ list ahead of MDS_A, and the new list will look like this:

| IRQ_LIST = MDS_C | | |
|---|---|---|
| MDS_C | MDS_A | MDS_B |
| MNext = MDS_A | MNext = MDS_B | MNext = NULL |
| MDelVal = 500 | MDelVal = 2000 | MDelVal = 2000 |
| Time = 500 | Time = 500 | Time = 1000 |

Notice that MDS_A.Time is now 500, meaning that MDS_A will execute 500 ticks after MDS_C, and since MDS_C executes 500 ticks after the current interrupt started, then MDS_A will execute 1000 ticks after the start of the current interrupt.

NextModule—Called at the end of the interrupt cycle. It looks at the time value of the next module to execute in the IRQ LIST, and updates the interrupt timer hardware to give the next interrupt at the corresponding position. This process will subtract the time elapsed since the beginning of the interrupt to cancel out the execution time of the last active process.

ExecModule—Called on entry into the interrupt cycle. Removes the first module data structure in the linked list of active processes from the list, and dispatches control to the first tasks in the task list pointed to by the MTLPntr (Task list Pointer). At this point, the currently executing process is no longer in the active process list, and the task which the process is executing must re-queue the process via a call to QueModule if the process is to remain active.

The following are task management and support routines and a brief explanation of their functions.

NextTask—Called from within an executing process. It increments the MTLPntr to point at the next task in the task list. Then it requeues the process via QueModule and exits via NextModule.

SetTask—Sets the MTLPntr to the specified value, requeues the process via QueModule and exits via NextModule.

OffMod—Cleans up the active process and exits via NextModule. It does not call QueModule, thereby turning off this process.

QueTaskList—Sets the MTLPntr of the specified process with the specified task list. Then if the process is not active (not in the IRQ list) QueTaskList will call QueModule to activate the new process.

AdvanceMotor—The motor port information is stored in the MDS (Module Data Structure) along with indexes into motor step tables which contain the values to be written out to the stepper motor for each state of the motor. The AdvanceMotor task will adjust the indexes in the MDS in the correct direction and write out the new values to the motor.

The following is an executive or high level task list (ETL) for the firmware for aligning and deskewing the check or other document. The following task list is arranged so that the task list is on the left hand column and the comments related thereto are in the right hand column. The space breaks indicate successive tasks in the executive task list. The movable edge detector/sensor is referred to as a datum sensor in the explanation below.

The address of the task to be performed is all that is present in the task list, so that incrementing through the task list is possible through the NextTask routine. Each task will normally terminate via the NextModule routine which will leave the task list pointer for the current process undisturbed and place the process in the proper position in the IRQ list so that it will execute again after MDelay time has passed.

| Executive Task List (ETL) | |
|---|---|
| Wait for Document. If document detected, then next task. | Wait until a document is detected. |
| QueTaskList HOME VER to MDS.VER | Start homing the transverse motor. |
| QueTaskList BringInSlow to MDS.TPT NextTask | Slowly bring in the document to be detected. |
| If MDS.VER completed, NextTask If 3 second timeout, SetTask BadHome. | Wait for the transverse motor to home, or for a timeout of 3 seconds. |
| QueTaskList BringIn to MDS.TPT NextTask | Start the normal BringIn task for the transport motor. |
| If MDS.VER, and MDS.TPT completed, NextTask If 6 second timeout, then SetTask ErrSkew | Wait for the BringIn task to be completed, or for a timeout of 6 seconds. |
| QueTaskList SizeDocument to MDS.TPT | Document is now aligned and deskewed. Start the Size Document task for the transport motor. |
| If MDS.VER, and MDS.TPT completed, NextTask If 6 second timeout, then SetTask ErrSize | Wait here until the document is sized or a timeout of 6 seconds. |
|  | The document has now been sized. The Size Document task ends with the sensor over the lower right corner of the document. The document is now checked for a tear or dogear (folded over). |
| If DATUM SENSOR Does not detect Document, Set Task ErrDogEar NextTask | If the lower right hand corner of the document isn't detected, then either the corner is torn off, or the corner is dogeared. |
| QueTaskList DetectTear | The document has passed the dogear test. Now the document is to be moved so that the sensor is just past the edge of the document. |
| If MDS.TPT and MDS.VER completed, NextTask | Wait for the move to be completed or a timeout of 1 second. |

| Executive Task List (ETL) —continued | |
|---|---|
| If 1 second timeout, SetTask ErrSize | |
| If DATUM SENSOR Detects Document, SetTask ErrDogEar NextTask | The document has now been moved so that the sensor should now be past the edge. If the edge is detected, there is an error. |
| End of Executive Task List | |

The document has now been aligned, deskewed and ready to be printed

The following are the lower level or detailed lists of the individual tasks (Tasks), under the executive task list described above. Again, the space breaks in the left hand column indicate successive tasks in each list.

| BringInSlow (Task) | |
|---|---|
| Set destination 20 inches in. Set Speed slow NextTask | Set the default movement to 20 inches in. The initial speed is relatively slow. This is to allow the VER module to home before speed is increased. |
| If at destination, NextTask, otherwise Step Motor | If destination is reached then advance to the next task; otherwise, the motor (TPT module) is stepped by one step. This task should actually never be completed since the ETL (Executive Task List) which is controlling the BringIn task will queue the normal BringIn task to the TPT Module as soon as the VER Module has finished it's home operation. |
| End of Task List. | |
| BringIn (Task) | |
| Set speed fast Set DESTINATION 20 Inches in | Now begins the real BringIn operation. This can be done fast, since the transverse head is in the correct position and ready for the document. Set the destination to 20 inches in for default. |
| If DATUM SENSOR Detects, NextTask If Distance Done, SetTask ErrBRINGIN Advance Motor One Step | Either moving in until the datum sensor sees the document Or moved too far (20 inches) Advance motor. |
| QueTaskList VER2Bot to MDS.VER Set Distance to 3 inches IN. ClearCurStep NextTask | The transverse motor is moved down to the bottom so we can check for the document deskew. Set up to move the document in another 3 inches so the datum sensor will check in the middle of the document. Clear the current step count so transport distances will be relative to this edge of the document. |
| If at Desired Location, NextTask Advance Motor One Step | If we have moved in 3 inches, then advance to the next task, otherwise the motor is stepped one more step. |
| End of Task List | The document is now in a |

VER2Bot (Task)
Set Destination 0
Set Speed Fast
NextTask

If at DESTINATION
then NextTask
Advance Motor One Step
QueTaskList
BWagDSkew to MDS.TPT.TPT End of Task List

BWagDSkew (Task)
Clear DESKEWCOUNT
NextTask

DSkewLoop
Set DESTINATION 4 inches in
Set Move FAST
NextTask

If at DESTINATION
then NextTask
Advance Motor One Step
If DATUM SENSOR Detects Document, Increment DESKEWCOUNT
If DESKEWCOUNT is 2, then SetTask Deskewed; otherwise clear DESKEWCOUNT
ENDIF
NextTask Set Destination 2 inches in from Start of Document
NextTask If at DESTINATION
then NextTask
Advance Motor One Step
If DATUM SENSOR Detects Document, Increment DESKEWCOUNT
If DESKEWCOUNT is 2,
then SetTask Deskewed;
Otherwise
Clear DESKEWCOUNT
ENDIF
SetTask DSkewLoop Deskewed End of Task List

Home Ver (Task)
Set DESTINATION 1/2 up
Next Task

If at DESTINATION, NextTask

Advance Motor One Step
Set DESTINATION 5 Inches down

NextTask
If DATUM SENSOR Detects, NextTask
If Distance Done, SetTask ErrHOME
Advance Motor One Step
Set DESTINATION 1 Inch UP
Set Speed Slow
NextTask
If DATUM SENSOR Does not Detect, NextTask
If Distance Done, SetTask ErrHOME
Advance Motor One Step
Set DESTINATION 1 Inch DOWN
Set Speed Slow
NextTask
If DATUM SENSOR Detects, NextTask
If Distance Done, SetTask ErrHOME
Advance Motor One Step
Set DESTINATION 1/16 inch UP
NextTask
If at DESTINATION, then NextTask
Advance Motor One Step
CirCurStep
Set DESTINATION 1 Inch UP
Set Speed Fast
Next Task
If at DESTINATION, then NextTask
Advance Motor One Step
End of Task.

SizeDocument.TL: (Task)
Set DESTINATION 8 Inches OUT
Set Speed Fast
NextTask If DATUM SENSOR position to begin the deskew operation. Stop this task list. The process probably won't get to this point, since VER2Bot will queue the wiggle task to the TPT Module when it completes.

Move the transverse head so the datum sensor is at the bottom of the document.
Advance to the next task.
Keep advancing the motor until the step count has read the destination.

Transverse head is at destination, so startup Deskew task for the Transport Module (TPT). This task list is complete. The transverse module is idle until the deskew task is completed.

The deskewcount is used to count the successive checks where the document was deskewed. The deskew task list will "wiggle" the document with the datum sensor going between 2 and 4 inches into the document.

This is in reference to the edge of the document.
The document can be wiggled back and forth quickly.
Stay with this task until the document is at the destination position.
If the document is seen as deskewed, (The datum sensor sees the document at the bottom edge of the transport) then the Deskewcount can be incremented. If the count is 2, then the document has been deskewed.
The document was not detected at this position, so the deskew counter is cleared.
Advance to the next task
The next check point is at 2 inches into the document.
Note that this will actually be a move of 2 inches out for the document.
Wait in this task until the document is at it's destination.

Perform the same deskew check as above.

Go back to the start of the loop if process is to continue.
If this times out, then the ETL controlling this operation will have to stop the routine.
The document is now deskewed and is against the edge.
The document can now be clamped.

Move up by .5 inches to make certain the datum sensor is not past the bottom of the light bar.
When destination has been reached, advance to the Next Task
Advance motor, and remain in this task.
Move down a maximum of 5 inches, looking for the bottom of the light bar.

Move down until the datum sensor detects the bottom edge of the docu-guide. (Error if moved too far).
Move the motor one step.
Move up off of the docu-guide.
Slow speed for accurate measurement.
Looking for the light bar again. Then the sensor will be at the edge. (Error if moved too far.)
Move the motor one step.

Move down again to find the edge of the guide
Move slowly to the edge of the document.
Looking for the light bar again. Then the sensor will be at the edge. (Error if moved too far.)
Move the motor one step.
Move up 1/16 inch to home position where deskew is verified.
When destination is reached, advance to the next task.
Step motor.
Clear step counter. This is position 0
Now the datum sensor is moved up 1 inch to wait for document entry.
When destination is reached, advance to the next task.
Step motor.

The sensor now looking for the leading edge of document.
Overshoot will occur, so moving fast is acceptable.
Continue in this state -continued

| | | | |
|---|---|---|---|
| Does Not Detect, NextTask If at DESTINATION, then ErrSize Advance Motor One Step | until sensor is off of the document. If destination is reached, then there has been an error and document can't be sized. Advance in the current direction with same speed. | CurStep QueTaskList Detect-RightEdge to MDS. TPT Set DESTINATION 1 Inch up from bottom NextTask | now in CurStep and is then set. Now the TPT routine is used to detect the right edge. Move to 1 inch up so the right edge can be detected. |
| Set DESTINATION 1 Inch IN Set Speed Slow NextTask If DATUM SENSOR Detects, NextTask If at DESTINATION, then ErrSize Advance Motor One Step CirCurStep Set DESTINATION 4 Inches IN QueTaskList Detect-Top to MDS.VER Set Speed FAST NextTask | Now slow movement back to document to find the edge accurately. Move the document until located by sensor. If destination is reached, then error in positioning during the SizeDocument task list. During the remainder of positioning this document, the position of the leading edge of the document will be position 0. Move 4 inches in, so the sensor will be over the middle of the document. While the document is being moved in 4 inches, the MDS.VER module detects the top of the document. When this process is completed, it will que another task list to MDS.TPT which may remove processing from 4 inch move. | If at DESTINATION, then NextTask Advance Motor One Step End of Task List DetectRightEdge (Task) | Has 1 inch up point been reached? Stay in this task until 1 inch up point is reached. This task list is now complete. The document height has been determined, and sensor is positioned 1 inch up from the base of the document to catch right edge. The TPT module is now running. The document is now about 4 inches in from the sensor. The process may have been queued before the document was positioned the full 4 inches in from the SizeDocument task list. The current position is in the module CurStep variable. |
| If at DESTINATION, then NextTask Advance Motor One Step End of Task List | Advance to the NextTask when destination is reached. Advance motor. This is the end of this task list. The document has been moved in 4 inches, and the leading edge of the document has been located. The DetectTop task list will start NDS.TPT when it is through. | Set DESTINATION 20 Inches IN Set Speed Fast NextTask If DATUM SENSOR Does Not Detect, NextTask If at DESTINATION then ErrSize Advance Motor One Step Set DESTINATION 1 Inch In Set Speed Slow NextTask If DATUM SENSOR Detects, NextTask | Now movement of a maximum of 20 inches IN occurs to find the right end edge. Do this quickly, come back slowly to find it more accurately. Continue movement until the edge of the document is detected. Positioning error while sizing the document. Advance motor and stay in task. Now document is moved back slowly to find the edge. The edge is detected. |
| DetectTop (Task) Set DESTINATION 4.25 Inches UP Set Speed Fast Next Task If DATUM SENSOR Does Not Detect, NextTask If at DESTINATION then NextTask Advance Motor One Step Set DESTINATION 1 Inch Down Set Speed Slow NextTask | Maximum document size is 8 inches when folded in half. Move to the top of the document. Looking for the top of the document. If no error on destination, the document is as tall as possible, and the top is considered to be 4.25 inches from the bottom. The sensor is either off the top of the document, or 4.25 inches up and still on the document. Now movement until the document is detected if sensor not originally on the document. | If at DESTINATION, then ErrSize Advance Motor One Step Set DOCLENGTH to CurStep QueTaskList Detect-Dogear to MDS.VER Set DESTINATION 3/16 Inch Out NextTask | Document moved so sensor is just off the edge. It should not more than 1 inch away. The document length is now in CurStep variable. Start the VER module on the detect dogear task list, which will move the sensor down to the bottom of the document. Sensor is pointing at the right edge now, the document is moved out 3/16 inch so sensor is at the lower right corner of the document. |
| If DATUM SENSOR Detects, NextTask If at DESTINATION, then ErrSize Advance Motor One Step Set DOCHEIGHT to | If the document is detected, then continue to next task. Error has occurred in the positioning if destination reached. The document height is | If at DESTINATION, then NextTask Advance Motor One Step End of Task List | If destination is reached, then exit via NextTask Until then advance the motor and remain in this task The document is now positioned so the sensor is 3/16 of an inch over the right edge of the document. When Detect-Dogear task list has |

| DetectDogear (Task) | |
|---|---|
| Set DESTINATION 1/6 Inch up from bottom | been completed, the sensor will be at the lower edge of the document, over the right bottom corner. Move sensor down to 1/16 of an inch up from the bottom of the document. |
| Set Speed Fast NextTask | |
| If at DESTINATION Then NextTask | If destination is reached, advance to the next task |
| Advance Motor One Step | Move the motor one step step, and remain within this task. |
| End of Task List | The sensor is now looking 1/16 of an inch up from the bottom edge of the document. If the sensor transport is in the correct position, the sensor will be looking at the lower right corner. It can then check for a dog-eared document. |
| DetectTear (Task) | |
| Set DESTINATION ¼ Inch IN | The document should be 3/16 of an inch past the sensor. The document now moved in so the sensor is 1/16 inch past the document. |
| Set Speed Fast NextTask | |
| If at DESTINATION, then NextTask | When destination is is reached, advance to the next task |
| Advance Motor One Step | Until then, step the motor and remain in this state. |
| End of Task List | The sensor is now 1/16 inch past the document. |

Referring now to FIG. 7, the sequence of relative movement of the laterally movable edge detector system 14 and the longitudinally movement of the check in order to accomplish positioning of the check in accordance with the above firmware control is as follows. Following initial recognition of the presence of a check by the first sensor means, the system motors are initiated, but the solenoid 50 is not activated so that the upper and lower gripping wheels for each roller assembly are not clamped. The check is moved longitudinally by action of the deskewing rollers, with some accompanying lateral movement (initial deskewing), until the leading edge 140 of the check is recognized by edge detector 14 in its home position at check point a. At this point in time, solenoid 50 is activated, resulting in the check being clamped. The check is then moved longitudinally while sensor 14 is moved laterally toward guide edge 31 (direction 142a) until check point b is reached. At this point, solenoid 50 is deactivated, the check is thus not clamped and deskewing of the check begins. During the deskewing process, detector 14 will move laterally across tray 12 while the check is moved longitudinally and laterally by the action of the deskewing rollers. The circles in FIG. 7 denote check points on the document which is being positioned at successive time points during the positioning process.

At check point b the longitudinal edge 146 of the check is recognized. The three deskewing rollers 28—28 are in contact with the check and can move the check longitudinally in both directions. In deskewing, the deskewing rollers move the check back and forth longitudinally between check points b and c relative to the detector 14, which remains at the same position during the process. At the same time, the check edge 146 is being moved toward the guiding edge 31, in direction 142a. When the detector 14 senses the edge of the check at both positions b and c, the check is deskewed, with edge 146 abutting guiding edge 31 of vertical wall 30 along the entire edge of the check.

The check is then moved backwardly in the 144b direction while the detector 14 is moved away from the guiding edge 131 in the 142b direction until the light has been uncovered. Then the check is moved forwardly in the 144a direction until the leading edge of the check is detected (check point d). The position of the leading edge is now known.

The detector 14 is then again moved in the 142b direction while the check is moved forwardly, in the 144a direction, approximately half the length of the check. The detector is moved beyond the edge 148 of the check and then is moved back in the 142a direction during continued forward movement of the check until the longitudinal edge 148 is detected (check point e). The check is then moved forwardly in the 144a direction another substantial distance while the detector 14 is moved in the 142a direction to the point where the trailing edge 150 of the check is forward of the detector 14. The check is then moved backwardly in the 142b direction while the detector 14 moves a slight distance in the 142a direction until the trailing edge 150 is detected (check point f).

At this point the check has been sized and the microprocessor knows where it is. The detector 14 is then moved further in the 142a direction while the check is moved backwardly in the 144b direction a small distance, to check for a dogear or tear in the righthand corner of the check (check point g). Then the check is moved forwardly such that the trailing edge 150 is ahead of the detector (check point h). Finally, the check is moved backwardly, in the 144b direction, and the sensor is moved outwardly in the 142b direction to check point i.

The check has now been completely deskewed, sized and positioned and is ready for printing. The detector 14 is in correct position (the print head is part of the detector structure in the embodiment shown) to begin printing the data on the check.

At this point, the dot matrix printer, under the control of the microprocessor, prints the selected information on the check, including as noted above, the data, the payee, and the amount of the check. A MICR encoder prints the check amount in MICR code and another dot matrix printer prints the proper endorsement on the back of the check, if desired. The apparatus then ejects the check for signature by the user.

Such an apparatus as described herein has significant advantages in both speed and accuracy over the current practice of writing checks by hand at the point of sale. Further, because the MICR amount and endorsement information are encoded/printed on the check at the same time as the other required information, the total amount of check handling required is significantly reduced, resulting in savings to the retail establishment.

In a modification of the present invention, the system at the store can be connected on line to bank information for vertification that the amount of the check is actually on deposit.

The present invention, while described herein primarily in the context of a point-of-sale check writing apparatus, can also be used in other applications in which checks must be handled automatically and deskewed and positioned without the aid of an operator. Still further, although the present invention has been described as being useful with checks, it should be understood that other documents may be used as well.

We claim:

1. A system for positioning a check or similar document in an apparatus which then performs predetermined operations on the document, such as printing, endorsing and the like, comprising:
    a guide tray, which includes a guiding edge, for receiving a check or similar document and for guiding the movement of the check in the apparatus;
    means for recognizing the presence of the check;
    means for selectively gripping and releasing the check;
    means associated with said gripping and releasing means for moving the check along the guide tray longitudinally in both directions;
    means independent of said gripping and releasing means for moving the check laterally toward the guiding edge of the guide tray during longitudinal movement of the check;
    sensor means for recognizing when a longitudinal edge of the check abuts the guiding edge of guide tray; and
    means for determining the location of at least one of the end edges of the check.

2. A system of claim 1, wherein the sensor means has the capability of recognizing all four edges of the check and the determining means includes means for determining the location of all four edges of the check.

3. A system of claim 2, including means for determining the presence of a dogear in a selected corner of the check.

4. A system of claim 1, wherein the guide tray is substantially horizontal, and the check is moved horizontally along the guide tray.

5. A system of claim 1, wherein the gripping and releasing means includes a plurality of separate gripping units, and further includes linkage means connecting said gripping units which is mechanically self-adjusting so that the gripping pressure on the check remains substantially exactly equal between each of the plurality of gripping units.

6. A system of claim 1, wherein the longitudinal and lateral check moving means and the gripping and releasing means includes a plurality of spaced assemblies, each assembly including a horizontal shaft, and upper gripping wheel and a deskewing roller mounted on the horizontal shaft and a lower gripping wheel, and means for selectively moving the lower gripping wheel into immediate proximity with the upper gripping wheel, so as to clamp the document therebetween, wherein the system further includes stepping motor means and a drive belt means for moving each of said horizontal shafts a selected and known rotational amount for each step of the motor.

7. A system of claim 6, wherein the means for moving the lower gripping wheels of each assembly includes linkage means for applying substantially exactly equal pressure on the check by each assembly.

8. A system of claim 1, wherein the sensor means includes a stationary light transmitting means positioned laterally across and beneath the guide tray and a laterally movable light receiving means located above the guide, said light receiving means arranged so as to move laterally but not longitudinally relative to said guide, wherein the combination of longitudinally controlled movement of the check and laterally controlled movement off the light receiving means permits accurate location of the edges of the check.

9. A system of claim 11, wherein the light diffusion from the light transmitting means is substantially equal across the guide tray.

10. A system of claim 9, wherein the light transmitting means includes a plurality of light sources and a substantially L-shaped light bar for transmitting light from the light sources to the surface of the guide tray.

11. A system of claim 10, wherein the light transmitting means includes a prism having one surface in the vicinity of the guide tray which is roughened to aid in the diffusion of the light from the light transmitting means.

12. A system for clamping on a check or similar document which is to be encoded or printed, including:
    means for supporting a check or similar document to permit movement relative thereto;
    a plurality of spaced clamping assemblies located along the supporting means, each clamping assembly including a pair of grippng elements located on opposite sides of the check which is positioned against said support means;
    means for controlling the respective pairs of gripping elements to clamp and unclamp the check; and
    mechanical linkage means connected to said controlling means and to said pairs of gripping elements, arranged and constructed so that substantially exactly equal pressure is applied to the check by each pair of gripping elements during movement of the check along the support means, regardless of the position of the check relative to the gripping elements.

13. A system of claim 12, wherein the linkage means is arranged so that it is substantially selfadjusting, and does not require individual adjustment of the gripping elements by an operator.

14. A system of claim 13, wherein each pair of gripping elements includes a fixed gripping wheel and a movable gripping wheel controlled by the controlling means and the linkage means.

* * * * *